United States Patent
Iwama et al.

(10) Patent No.: US 12,243,665 B2
(45) Date of Patent: Mar. 4, 2025

(54) WIRE HARNESS

(71) Applicant: SUMITOMO WIRING SYSTEMS, LTD., Yokkaichi (JP)

(72) Inventors: Takuji Iwama, Yokkaichi (JP); Yuji Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 177 days.

(21) Appl. No.: 17/910,084

(22) PCT Filed: Mar. 15, 2021

(86) PCT No.: PCT/JP2021/010344
§ 371 (c)(1),
(2) Date: Sep. 8, 2022

(87) PCT Pub. No.: WO2021/193191
PCT Pub. Date: Sep. 30, 2021

(65) Prior Publication Data
US 2023/0124892 A1    Apr. 20, 2023

(30) Foreign Application Priority Data

Mar. 27, 2020   (JP) ................................. 2020-058861

(51) Int. Cl.
*H01B 7/00*    (2006.01)
*B60R 16/02*   (2006.01)
(Continued)

(52) U.S. Cl.
CPC ....... *H01B 7/0009* (2013.01); *B60R 16/0215* (2013.01); *H01B 7/0045* (2013.01);
(Continued)

(58) Field of Classification Search
CPC .......... H01B 5/06; H01B 5/08; H01B 7/0045; H01B 7/0072; H01B 7/16; H01B 7/20
See application file for complete search history.

(56) References Cited

U.S. PATENT DOCUMENTS 2,173,717 A  *  9/1939  Hobart ................. H01B 9/0672
                                                    310/55
3,686,598 A  *  8/1972  Ozawa .................... H01F 38/30
                                                    336/62
(Continued)

FOREIGN PATENT DOCUMENTS

EP        0993994 A1    4/2000
JP     2000-164042 A    6/2000
(Continued)

OTHER PUBLICATIONS

May 25, 2021 International Search Report issued in International Patent Application No. PCT/JP2021/010344.

*Primary Examiner* — Chau N Nguyen
(74) *Attorney, Agent, or Firm* — Oliff PLC

(57) ABSTRACT

A wire harness including: a first conductive path; a second conductive path that is different from the first conductive path; and an exterior cover that covers the first conductive path and the second conductive path, wherein: the first conductive path includes a conductive first tubular conductor that is tubular in shape, the second conductive path includes a conductive second tubular conductor that is tubular in shape, and a thickness of the first tubular conductor is different from a thickness of the second tubular conductor.

10 Claims, 5 Drawing Sheets

(51) Int. Cl.
  *H01B 7/18*  (2006.01)
  *H02G 3/04*  (2006.01)
  *H02G 3/30*  (2006.01)
  *H01B 7/282* (2006.01)

(52) U.S. Cl.
  CPC ......... *H01B 7/1805* (2013.01); *H02G 3/0468* (2013.01); *H02G 3/30* (2013.01); *H01B 7/2825* (2013.01)

(56) References Cited

U.S. PATENT DOCUMENTS

| | | | | |
|---|---|---|---|---|
| 4,196,307 A | * | 4/1980 | Moore | H01B 7/045 |
| | | | | 57/221 |
| 4,963,420 A | * | 10/1990 | Jarrin | D07B 1/20 |
| | | | | 174/101.5 |
| 7,094,970 B2 | * | 8/2006 | Kihira | B60L 50/51 |
| | | | | 174/78 |
| 10,118,573 B2 | * | 11/2018 | Nakai | H02G 3/0487 |
| 2003/0236016 A1 | | 12/2003 | Murakami et al. | |
| 2008/0257579 A1 | * | 10/2008 | Hirose | H01B 12/16 |
| | | | | 174/15.5 |
| 2010/0230130 A1 | * | 9/2010 | Park | H01B 11/1839 |
| | | | | 156/51 |
| 2016/0268019 A1 | * | 9/2016 | Kanagawa | B60R 16/0215 |
| 2022/0006273 A1 | * | 1/2022 | Iwama | H01B 7/0045 |

FOREIGN PATENT DOCUMENTS

| | | |
|---|---|---|
| JP | 2004-95530 A | 3/2004 |
| JP | 2018-024419 A | 2/2018 |
| WO | WO 2013-077463 * | 5/2013 |
| WO | 2016/171204 A1 | 10/2016 |
| WO | 2016/181818 A1 | 11/2016 |

* cited by examiner

WIRE HARNESS

BACKGROUND

The present disclosure relates to a wire harness.

Conventionally, some wire harnesses mounted in vehicles are provided with a conductive path including a tubular conductor that has a tubular shape that is maintainable, as disclosed in WO 2016/171204, for example. The conductive path electrically connects electrical devices mounted in a vehicle to each other.

SUMMARY

Some of the wire harnesses as described above have a plurality of conductive paths each having a tubular conductor. In such wire harnesses, if current values of the currents that flow through the conductive paths are different from each other, transverse sectional areas of the tubular conductors will be ensured in accordance with current values of the currents that flow through the respective conductive paths. For example, if the outer diameters of the tubular conductors are changed while the thickness of the tubular conductors is kept constant, transverse sectional areas corresponding the current value of the current that flows through the respective tubular conductors can be easily ensured.

Generally, if a tubular conductor having a poor flexibility is used for a wire harness, the tubular conductor is formed in a shape that is adapted to a routing path by being bent with a pipe bender (pipe bending device) in advance. A mold corresponding to the outer diameter of the tubular conductor to be bent is used for the pipe bender. Accordingly, in order to bend a plurality of tubular conductors having various outer diameters, the mold of the pipe bender is switched according to the outer diameter of the tubular conductor, leading to a problem in that the manufacturability of the wire harness is decreased.

An exemplary aspect of the disclosure provides a wire harness capable of improving manufacturability.

A wire harness according to the present disclosure is a wire harness including a first conductive path, a second conductive path that is different from the first conductive path, and an exterior cover that covers the first conductive path and the second conductive path, and the first conductive path includes a conductive first tubular conductor that is tubular in shape, the second conductive path includes a conductive second tubular conductor that is tubular in shape, and a thickness of the first tubular conductor is different from a thickness of the second tubular conductor.

According to the wire harness of the present disclosure, manufacturability can be improved.

DETAILED DESCRIPTION OF EMBODIMENTS

Figure 1:
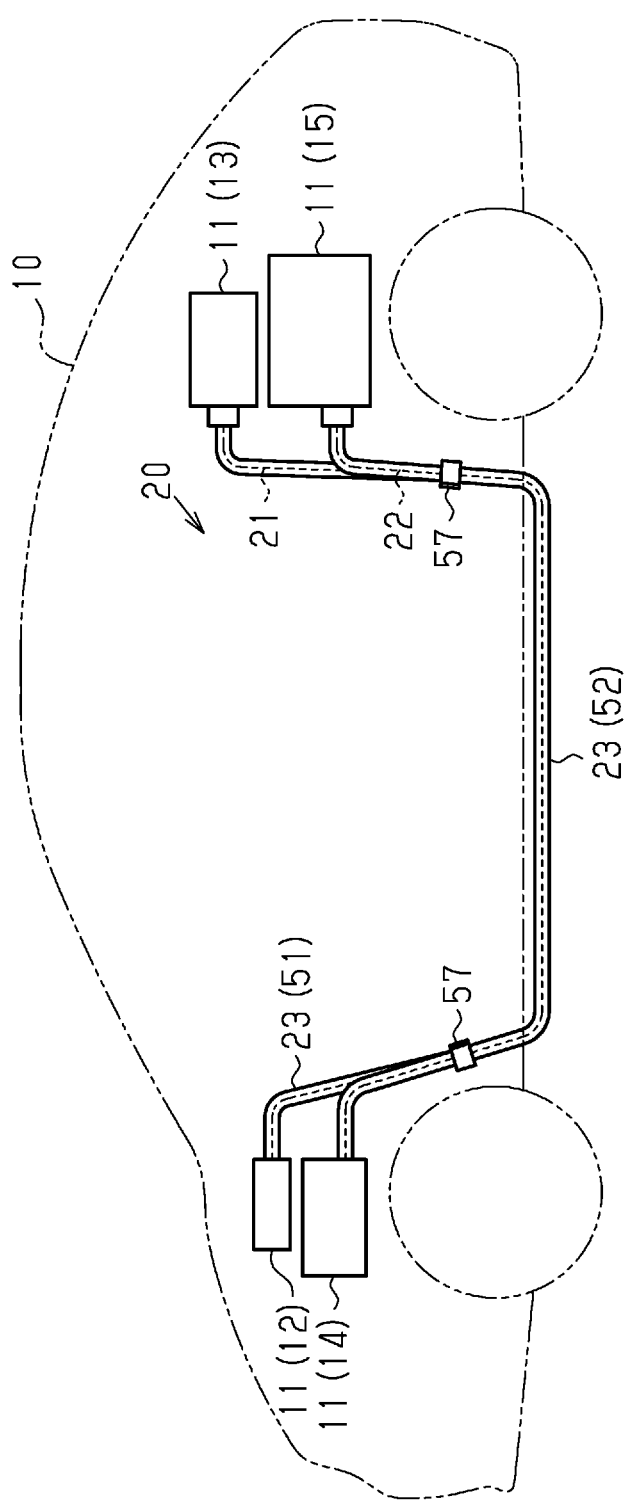
FIG. 1 is a schematic diagram showing a state in which a wire harness according to an embodiment is routed in a vehicle.

Description of Embodiment of the Present Disclosure

First, embodiments of the present disclosure will be listed and described.

[1] A wire harness according to the present disclosure is a wire harness including a first conductive path, a second conductive path that is different from the first conductive path, and an exterior member covering the first conductive path and the second conductive path, and the first conductive path includes a conductive first tubular conductor that is tubular in shape, the second conductive path includes a conductive second tubular conductor that is tubular in shape, and a thickness of the first tubular conductor is different from a thickness of the second tubular conductor.

With this configuration, the outer diameters of the first tubular conductor and the second tubular conductor can be the same length, or lengths that are close enough that the same mold can be used for the pipe bender, while ensuring the respective transverse sectional area corresponding to the current values of the currents that flow through the first tubular conductor and the second tubular conductor. By doing so, the first tubular conductor and the second tubular conductor can be bent without switching the mold of the pipe bender. As a result, the manufacturability of the wire harness can be improved.

[2] It is preferable that the first conductive path further includes a conductive first flexible conductor electrically connected to an end portion of the first tubular conductor, the second conductive path further includes a conductive second flexible conductor electrically connected to an end portion of the second tubular conductor, the first flexible conductor is more flexible than the first tubular conductor, and the second flexible conductor is more flexible than the second tubular conductor.

With this configuration, when the vehicle vibrates, positional displacement between components connected to the two ends of the first flexible conductor caused by the vibration can be absorbed through the first flexible conductor. Similarly, the positional displacement between parts connected to the two ends of the second flexible conductor caused by the vibration can be absorbed through the second flexible conductor.

[3] It is preferable that the first tubular conductor and the first flexible conductor are collectively covered with the exterior member, and the second tubular conductor and the second flexible conductor are collectively covered with the exterior member.

With this configuration, since the same exterior member can be used for covering the first tubular conductor and the first flexible conductor, the number of parts can be reduced compared to the case in which an exterior member for covering the first tubular conductor and an exterior member for covering the first flexible conductor are separately provided. Also, since the joint between the portion of the exterior member for covering the first tubular conductor and the portion for covering the first flexible conductor can be eliminated from the exterior member, ingress of liquid such as water into the exterior member can be suppressed. As a result, adhesion of liquid to the portion where the first tubular conductor and the first flexible conductor are electrically connected can be suppressed. Further, a waterblocking member such as a grommet does not need to be arranged at the joint.

Similarly, since the same exterior member can be used for covering the second tubular conductor and the second flexible conductor, the number of parts can be reduced compared to the case in which an exterior member for covering the second tubular conductor and an exterior member for covering the second flexible conductor are separately provided. Also, since the joint between the portion of the exterior member for covering the second tubular conductor and the portion for covering the second flexible conductor can be eliminated from the exterior member, ingress of liquid such as water into the exterior member can be suppressed. As a result, adhesion of liquid to the portion where the second tubular conductor and the second flexible conductor are electrically connected can be suppressed. Further, a waterblocking member such as a grommet does not need to be arranged at the joint.

[4] It is preferable that the exterior member is a corrugated tube that is more flexible than the first tubular conductor and the second tubular conductor, there is a gap that allows relative movement of the corrugated tube and the first tubular conductor in a direction orthogonal to an axial direction of the corrugated tube, between an outer circumferential surface of the first tubular conductor and an inner circumferential surface of the corrugated tube, there is a gap that allows relative movement of the corrugated tube and the second tubular conductor in a direction orthogonal to the axial direction of the corrugated tube, between an outer circumferential surface of the second tubular conductor and the inner circumferential surface of the corrugated tube, and the wire harness further comprises a fixing member that holds the corrugated tube and is to be fixed to a vehicle.

With this configuration, the first tubular conductor can move in the direction orthogonal to the axial direction of the corrugated tube relative to the corrugated tube within the range of the gap between the outer circumferential surface of the first tubular conductor and the inner circumferential surface of the corrugated tube. Also, the first tubular conductor is fixed to the vehicle by the corrugated tube being fixed to the vehicle using the fixing member. For this reason, due to deformation of the corrugated tube, which is more flexible than the first tubular conductor, the dimensional tolerance between the vehicle and the first tubular conductor can be absorbed without moving the first tubular conductor relative to the vehicle.

Similarly, the second tubular conductor can move in the direction orthogonal to the axial direction of the corrugated tube relative to the corrugated tube within the range of the gap between the outer circumferential surface of the second tubular conductor and the inner circumferential surface of the corrugated tube. Also, the second tubular conductor is fixed to the vehicle by the corrugated tube being fixed to the vehicle using the fixing member. For this reason, due to deformation of the corrugated tube, which is more flexible than the second tubular conductor, the dimensional tolerance between the vehicle and the second tubular conductor can be absorbed without moving the second tubular conductor relative to the vehicle.

[5] It is preferable that the exterior member includes a first exterior member covering the first conductive path and a second exterior member that is provided separately from the first exterior member and covers the second conductive path.

With this configuration, the wire harness can be made more compact compared to the case where the first conductive path and the second conductive path are collectively covered with one exterior member.

[6] It is preferable that the exterior member collectively covers the first conductive path and the second conductive path.

With this configuration, the number of parts can be reduced compared to the case in which an exterior member for covering the first conductive path and an exterior member for covering the second conductive path are separately provided. Also, since the first conductive path and the second conductive path are housed in the one exterior member, the wire harness can be easily handled. Accordingly, the wire harness can be easily fixed to the vehicle.

[7] It is preferable that the first tubular conductor includes, at an end portion of the first tubular conductor, a first connection portion that includes a flat first connection surface, the second tubular conductor includes, at an end portion of the second tubular conductor, a second connection portion that includes a flat second connection surface, the first connection portion has a first connection hole that passes through the first connection portion in a direction intersecting the first connection surface, and the second connection portion has a second connection hole that passes through the second connection portion in a direction intersecting the second connection surface.

With this configuration, by using a bolt or the like, the first connection portion can be directly connected to a connection member such as a terminal included in an electrical device mounted in the vehicle. For this reason, a connection terminal connected to the connection member of the electrical device need not be separately connected to the end portion of the first tubular conductor. Accordingly, the number of parts constituting the first conductive path can be reduced. Similarly, by using a bolt or the like, the second connection portion can be directly connected to a connection member such as a terminal included in the electrical device mounted in the vehicle. For this reason, a connection terminal connected to the connection member of the electrical device need not be separately connected to the end portion of the second tubular conductor. Accordingly, the number of parts constituting the second conductive path can be reduced.

[8] It is preferable that the first connection hole is an oblong hole elongated in a direction in which the first tubular conductor extends, and the second connection hole is an oblong hole elongated in a direction in which the second tubular conductor extends.

With this configuration, the dimensional tolerance between the connection member of the electrical device and the first conductive path in the direction in which the first tubular conductor extends can be absorbed through the first connection hole. Similarly, the dimensional tolerance between the connection member of the electrical device and the second conductive path in the direction in which the second tubular conductor extends can be absorbed through the second connection hole.

Detailed Description of Embodiment of the Present Disclosure

Specific examples of a wire harness according to the present disclosure will be described below with reference to the drawings. The present disclosure is not limited to the examples disclosed herein, but is defined in the claims, and is intended to include all modifications within the meaning and the scope equivalent to the claims.

Hereinafter, an embodiment of a wire harness will be described. In the diagrams, for convenience of description, some configurations may be exaggerated or simplified. Also, the dimensional proportions of the constituent elements may differ from the actuality or those in the other diagrams.

Overall Configuration of Wire Harness 20

As shown in FIG. 1, a wire harness 20 electrically connects electrical devices 11 mounted in a vehicle 10 such as an automobile. In FIG. 1, only four electrical devices 11 out of the plurality of electrical devices 11 mounted in the vehicle are shown. The wire harness 20 is bent and routed in accordance with the shape of a space for routing the wire harness 20. Also, the wire harness 20 of the present embodiment is mostly routed under a floor of the vehicle 10. The wire harness 20 can be used as a low-voltage harness to which a current is supplied from a low-voltage battery capable of supplying a voltage of about 12 V, for example, and can also be used as a high-voltage harness to which a current is supplied from a high-voltage battery capable of supplying a voltage of 100 V or more that is higher than the voltage output from the low-voltage battery.

Figure 2:
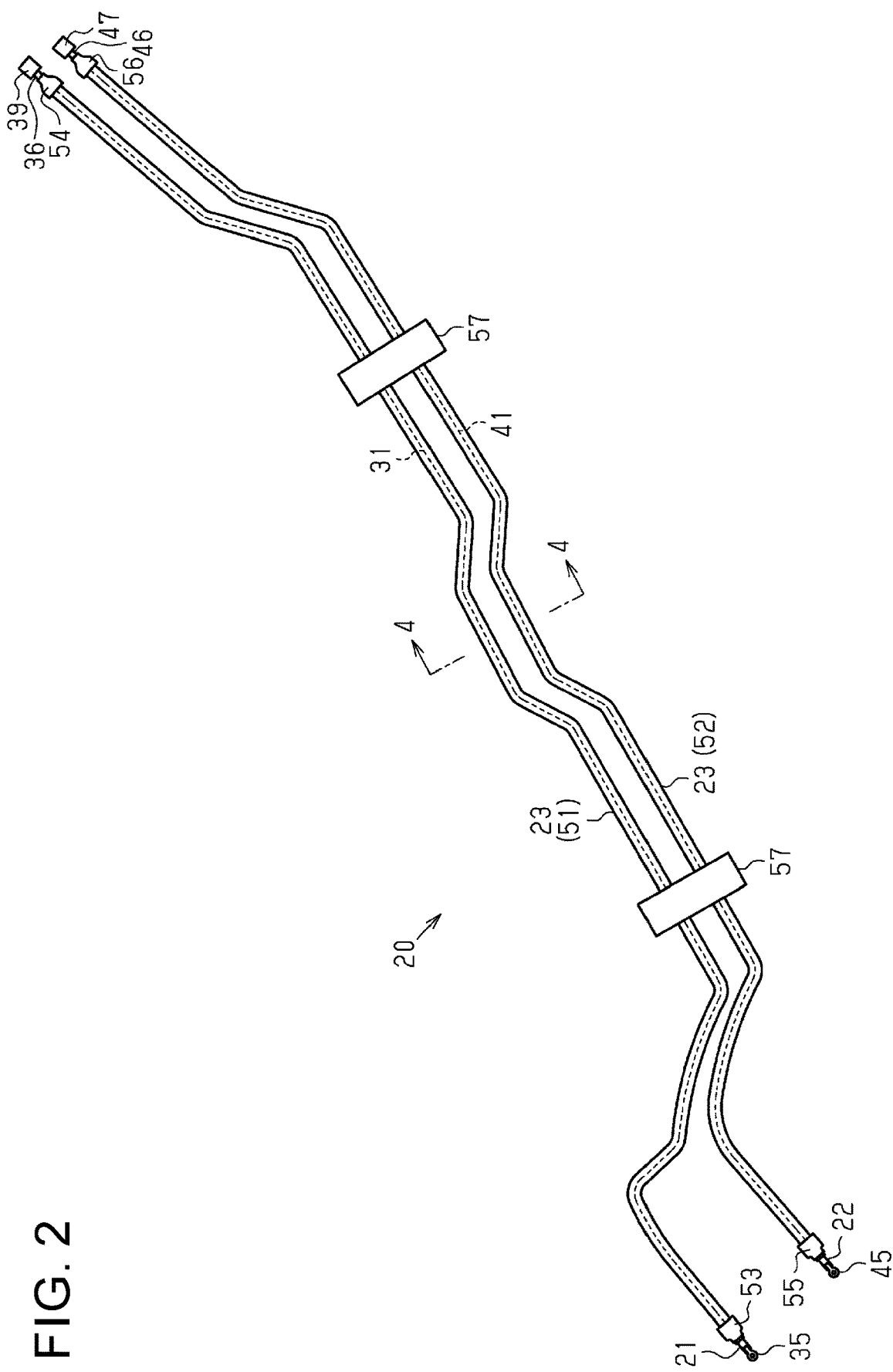
FIG. 2 is a schematic diagram showing the wire harness according to the embodiment.

As shown in FIGS. 1 and 2, the wire harness 20 includes a first conductive path 21, a second conductive path 22 that is different from the first conductive path 21, and exterior members 23 (exterior cover) that respectively cover the first conductive path 21 and the second conductive path 22.

The first conductive path 21 electrically connects, out of the electrical devices 11, an electrical device 12 arranged at a location on the front side of the vehicle 10 and an electrical device 13 arranged at a location on the rear side of the vehicle 10 relative to the electrical device 12 to each other. The second conductive path 22 electrically connects, out of the electrical devices 11, an electrical device 14 arranged at a location on the front side of the vehicle 10 and an electrical device 15 arranged at a location on the rear side of the vehicle 10 relative to the electrical device 12 to each other.

Configuration of First Conductive Path 21

Figure 3:
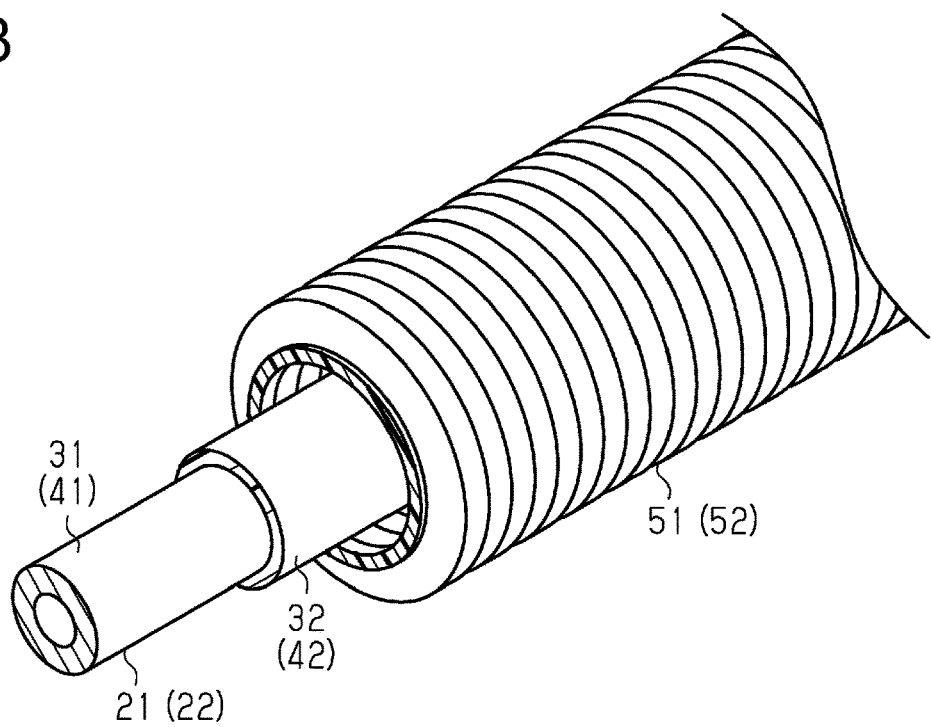
FIG. 3 is a perspective view showing a portion of a conductive path according to the embodiment.

As shown in FIG. 3, the first conductive path 21 includes a conductive first tubular conductor 31 that is tubular in shape. The first tubular conductor 31 is a tubular conductor having a hollow internal structure. The first tubular conductor 31 can hold its shape. Examples of the material for the first tubular conductor 31 include a copper-based or aluminum-based metal material. Note that, in FIG. 2, the first tubular conductor 31 is shown by broken lines in a simplified manner.

Figure 4:
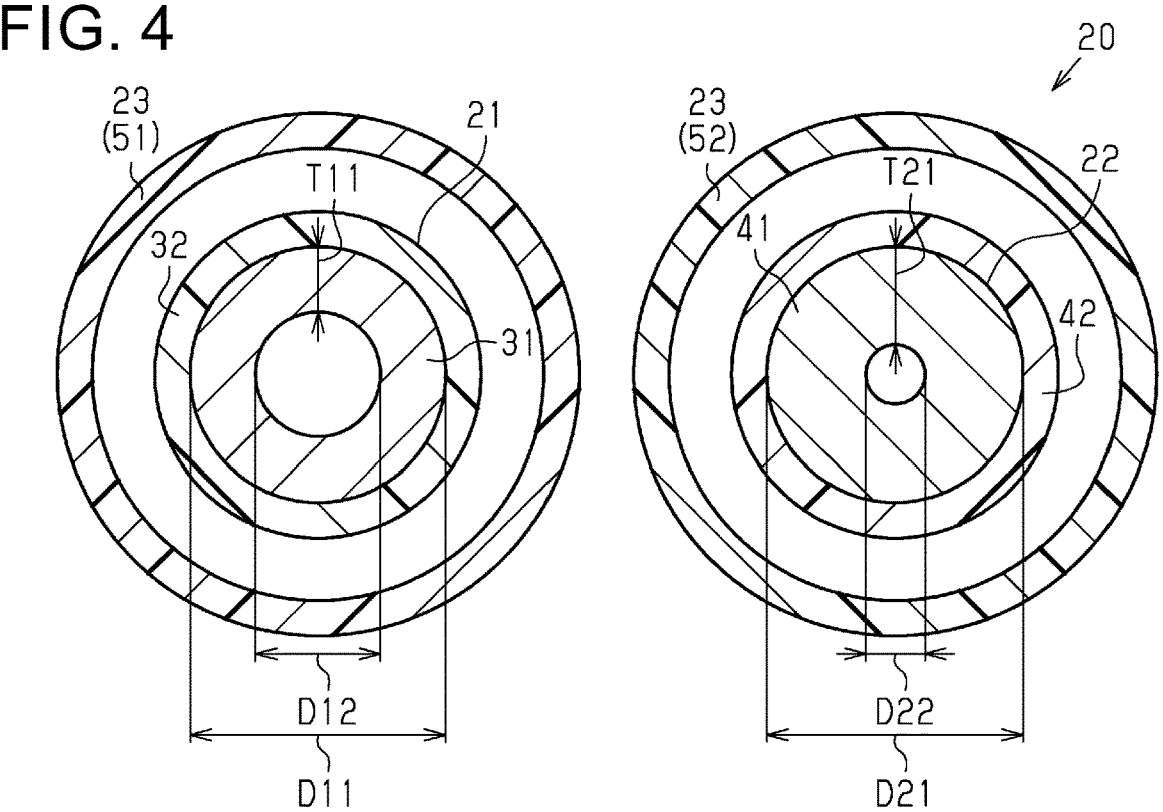
FIG. 4 is a diagram showing an end face of the wire harness according to the embodiment.

As shown in FIG. 4, the cross sectional shape (i.e., transverse sectional shape) taken by cutting the first tubular conductor 31 along a plane perpendicular to a lengthwise direction of the first tubular conductor 31, that is, the axial direction of the first tubular conductor 31 in which the first tubular conductor 31 extends, can be any shape. Note that FIG. 4 is an end-surface view taken along line 4-4 in FIG. 3. In the present embodiment, the cross sectional shape of the first tubular conductor 31 is a circular ring-like shape. In other words, the first tubular conductor 31 of the present embodiment is formed in a cylindrical shape. Also, the cross sectional shape of the first tubular conductor 31 of the present embodiment is constant, excluding the two end portions of the first tubular conductor 31. For this reason, an outer diameter D11 and an inner diameter D12 of the first tubular conductor 31 is constant along the direction in which the first tubular conductor 31 extends, and a thickness T11 of the first tubular conductor 31 is constant along the direction in which the first tubular conductor 31 extends, excluding the two end portions of the first tubular conductor 31.

The first conductive path 21 includes an insulating covering 32 that covers an outer circumferential surface of the first tubular conductor 31. The insulating covering 32 is made of an insulating material such as a synthetic resin. The insulating covering 32 has a tubular shape. In the present embodiment, the insulating covering 32 is externally fitted to the first tubular conductor 31 before the first tubular conductor 31 is bent. Then, first tubular conductor 31 is formed in a shape that is adapted to a routing path in the vehicle 10 by being bent at a plurality of locations in a state where the insulating covering 32 is fitted thereto using a pipe bender. Note that the two end portions of the first tubular conductor 31 in the lengthwise direction protrude from the insulating covering 32 and are exposed outside of the insulating covering 32.

Figure 5:
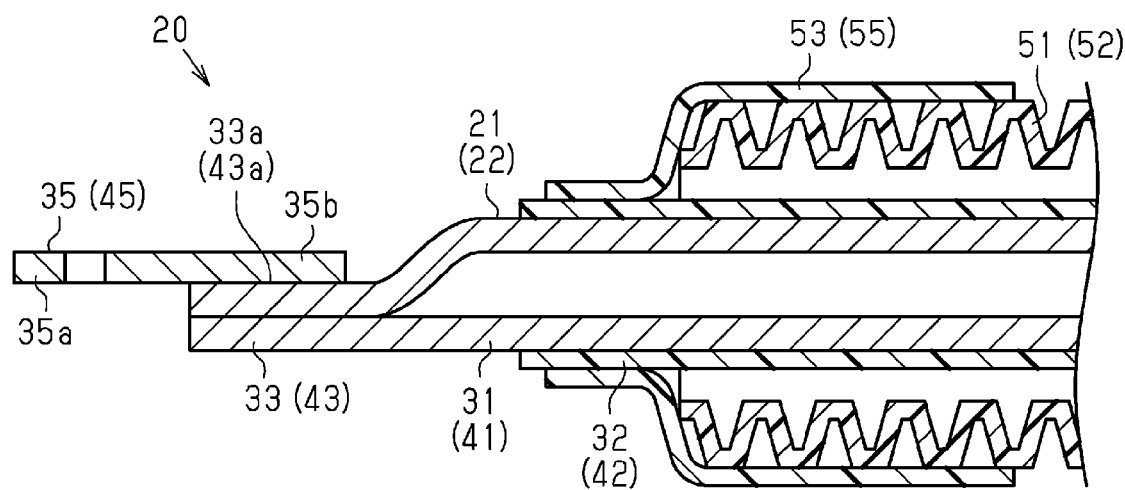
FIG. 5 is a cross-sectional view showing an end portion of the conductive path according to the embodiment.
Figure 6:
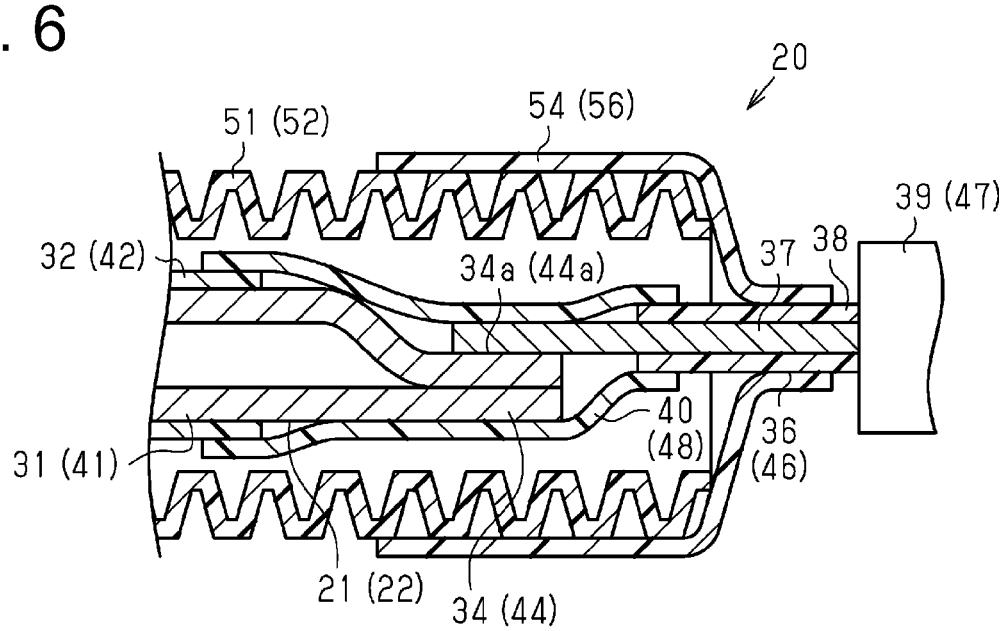
FIG. 6 is a cross-sectional view showing an end portion of the conductive path according to the embodiment.

As shown in FIGS. 5 and 6, the first tubular conductor 31 includes a first connection portion 33 (first connection) at one end portion of the first tubular conductor 31, and a first connection portion 34 (first connection) at the other end portion of the first tubular conductor 31. In the present embodiment, the first connection portion 33 is provided at an end portion arranged on the front side of the vehicle 10, out of the two end portions of the first tubular conductor 31 in the lengthwise direction. On the other hand, the first connection portion 34 is provided at an end portion arranged on the rear side of the vehicle 10, out of the two end portions of the first tubular conductor 31 in the lengthwise direction.

As shown in FIG. 5, the first connection portion 33 is a portion of the first tubular conductor 31 that is formed by one end portion of the first tubular conductor 31 being flattened into a flat shape. The first connection portion 33 includes a flat first connection surface 33a. In the present embodiment, the first connection surface 33a is a plane surface parallel with the direction in which the first tubular conductor 31 extends.

As shown in FIG. 6, the first connection portion 34 is a portion of the first tubular conductor 31 that is formed by the other end portion of the first tubular conductor 31 being flattened into a flat shape. The first connection portion 34 includes a flat first connection surface 34a. In the present embodiment, the first connection surface 34a is a plane surface parallel with the direction in which the first tubular conductor 31 extends.

As shown in FIG. 5, the first conductive path 21 includes a connection terminal 35 connected to the first connection portion 33. The connection terminal 35 is made of a conductive metal material. Examples of materials for the connection terminal include a copper-based or aluminum-based metal material. The connection terminal 35 of the present embodiment is a round terminal having an annular external connection terminal 35a and a fixing portion 35b that extends from the external connection terminal 35a. The fixing portion 35b of the connection terminal 35 is arranged on the first connection surface 33a. Due to the fixing portion 35b and the first connection portion 33 being connected through welding such as ultrasonic welding, the first connection portion 33 and the connection terminal 35 are electrically connected to each other. Further, the connection terminal 35 is electrically connected to a connection member such as a terminal (not shown) included in the electrical device 12. In the present embodiment, the external connection terminal 35a is electrically connected to this connection member.

As shown in FIG. 6, the first conductive path 21 includes a first flexible conductor 36 that is conductive and electrically connected to an end portion of the first tubular conductor 31. The first flexible conductor 36 is more flexible than the first tubular conductor 31. In the present embodiment, the first flexible conductor 36 is a covered wire that has a core wire 37 formed by a conductor and an insulating covering 38 that covers the outer circumference of the core wire 37. As the core wire 37, a twisted wire formed by twisting a plurality of metal strands, a single core wire formed by a columnar single metal wire that has a solid internal structure, or the like can be used, for example. Note that the core wire 37 is more flexible than the first tubular conductor 31. Examples of materials for the core wire 37 include a copper-based and aluminum-based metal materials. The insulating covering 38 is made of an insulating material such as a synthetic resin.

One end portion of the first flexible conductor 36 in the lengthwise direction is electrically connected to the first connection portion 34. At the one end portion of the first flexible conductor 36 that is connected to the first connection portion 34, the insulating covering 38 has been removed and the core wire 37 is exposed. Also, the one end portion of the first flexible conductor 36 at which the core wire 37 is exposed is arranged on the first connection surface 34a and electrically connected to the first connection portion 34 through welding such as ultrasonic welding.

The other end portion of the first flexible conductor 36 in the lengthwise direction is electrically connected to the connection terminal (not shown) provided on the connector 39. Note that the connector 39 is electrically connected to the electrical device 13.

The first conductive path 21 includes a covering member 40 that covers a portion at which the first tubular conductor 31 and the first flexible conductor 36 are connected. The covering member 40 is formed by an insulating material. The covering member 40 of the present embodiment is a heat shrinkable tube. The covering member 40 covers a portion of the other end portion of the first tubular conductor 31 that is exposed from the insulating covering 32 and the portion of the one end portion of the first flexible conductor 36 at which the core wire 37 is exposed.

Configuration of Second Conductive Path 22

As shown in FIG. 3, the second conductive path 22 includes a conductive and tubular second tubular conductor 41. Similarly to the first tubular conductor 31, the second tubular conductor 41 is a tubular conductor that has a hollow internal structure. The second tubular conductor 41 can maintain its shape. Examples of materials for the second tubular conductor 41 include a copper-based and aluminum-based metal materials. Note that, in FIG. 2, the second tubular conductor 41 is shown by broken lines in a simplified manner.

As shown in FIG. 4, a cross sectional shape (i.e., transverse sectional shape) taken by cutting the second tubular conductor 41 along a plane perpendicular to a lengthwise direction of the second tubular conductor 41, that is, a direction in which the second tubular conductor 41 extends and an axial direction of the second tubular conductor 41, can be any shape. In the present embodiment, the cross-sectional shape of the second tubular conductor 41 is a circular ring-like shape. In other words, the second tubular conductor 41 of the present embodiment is formed in a cylindrical shape. Also, the cross-sectional shape of the second tubular conductor 41 of the present embodiment is constant, excluding the two end portions of the second tubular conductor 41. For this reason, an outer diameter $D21$ and an inner diameter $D22$ of the second tubular conductor 41 is constant along the direction in which the second tubular conductor 41 extends, and a thickness $T21$ of the second tubular conductor 41 is constant along the direction in which the second tubular conductor 41 extends, excluding the two end portions of the second tubular conductor 41.

Here, the thickness $T11$ of the first tubular conductor 31 is different from the thickness $T21$ of the second tubular conductor 41. The current value of the current that flows through the first conductive path 21 is different from the current value of the current that flows through the second conductive path 22. Furthermore, the current value of the current that flows through the first conductive path 21 is smaller than the current value of the current that flows through the second conductive path 22. The thickness $T11$ of the first tubular conductor 31 and the thickness $T21$ of the second tubular conductor 41 are respectively set in accordance with the current value of the current that flows through first conductive path 21 and the current value of the current that flows through the second conductive path 22. Specifically, the thickness $T11$ of the first tubular conductor 31 is set to a value at which the transverse sectional area of the first tubular conductor 31 is ensured, in accordance with the current value of the current that flows through the first tubular conductor 31. Also, the thickness $T21$ of the second tubular conductor 41 is set to a value at which the transverse sectional area of the second tubular conductor 41 is ensured, in accordance with the current value of the current that flows through the second tubular conductor 41. In other words, in the wire harness 20, the larger the current value of the current that flows through the tubular conductor, the thicker the thickness and the larger the transverse sectional area of the tubular conductor. In the present embodiment, the outer diameter $D11$ of the first tubular conductor 31 is equal to the outer diameter $D21$ of the second tubular conductor 41. Note that, in the present specification, the case in which the outer diameter $D11$ of the first tubular conductor 31 is "equal to" the outer diameter $D21$ of the second tubular conductor 41 includes not only a case in which the outer diameters $D11$ and $D21$ are exactly the same value, but also a case in which the outer diameters $D11$ and $D21$ are different values within a range in which the same mold can be used when bending the tubular conductors 31 and 41 using a pipe bender.

Note that, in the present embodiment, the second conductive path 22 has substantially the same configuration as the first conductive path 21, excluding the thickness $T21$ of the second tubular conductor 41. Accordingly, in FIGS. 3, 5, and 6, the constituent elements of the second conductive path 22 corresponding to those of the first conductive path 21 are indicated by reference numerals in parentheses, and the two end portions of the second conductive path 22 will not be separately shown. Note that, the thicknesses of the tubular conductor shown in FIGS. 3, 5, and 6 are the thicknesses of the first tubular conductor 31, and the thicknesses of the second tubular conductor 41 are thicker than those of the tubular conductor shown in FIGS. 3, 5, and 6.

As shown in FIG. 4, the second conductive path 22 includes the insulating covering 42 that covers the outer circumferential surface of the second tubular conductor 41. The insulating covering 42 is similar to the insulating covering 32 provided on the first conductive path 21. In the present embodiment, the insulating covering 42 is externally fitted to the first tubular conductor 31 before the second tubular conductor 41 is bent. Then, the second tubular conductor 41 is formed in a shape that is adapted to the routing path in the vehicle 10 by being bent at a plurality of locations in a state where the insulating covering 42 is fitted thereto, using a pipe bender. Note that the two end portions of the second tubular conductor 41 in the lengthwise direction protrude from the insulating covering 42 and are exposed outward of the insulating covering 42.

As shown in FIGS. 5 and 6, the second tubular conductor 41 includes a second connection portion 43 (second connection) at one end portion of the second tubular conductor 41, and a second connection portion 44 (second connection) at the other end portion of the second tubular conductor 41. In the present embodiment, the second connection portion 43 is provided at an end portion arranged on the front side of the vehicle 10, out of the two end portions in the lengthwise direction of the second tubular conductor 41. On the other hand, the second connection portion 44 is provided at an end portion arranged on the rear side of the vehicle 10 out of the two end portions in the lengthwise direction of the second tubular conductor 41.

As shown in FIG. 5, the second connection portion 43 has a shape that is similar to the first connection portion 33. The second connection portion 43 is provided with a flat second connection surface 43a that is similar to the first connection surface 33a. In the present embodiment, the second connection surface 43a is a plane surface that is parallel with a direction in which the second tubular conductor 41 extends.

As shown in FIG. 6, the second connection portion 44 has a shape that is similar to the first connection portion 34. The second connection portion 44 is provided with a flat second connection surface 44a that is similar to the first connection portion 34. In the present embodiment, the second connection surface 44a is a plane surface that is parallel with the direction in which the second tubular conductor 41 extends.

As shown in FIG. 5, the second conductive path 22 includes a connection terminal 45 connected to the second connection portion 43. The connection terminal 45 is similar to the connection terminal 35 provided on the first conductive path 21. The fixing portion 35b of the connection terminal 45 is arranged on the second connection surface 43a. Further, due to the fixing portion 35b and the second connection portion 43 being connected through welding such as ultrasonic welding, the second connection portion 43 and the connection terminal 45 are electrically connected to each other. The connection terminal 45 is electrically connected to a connection member (not shown) such as a terminal included in the electrical device 14. In the present embodiment, the external connection terminal 35a of the connection terminal 45 is electrically connected to the connection member.

As shown in FIG. 6, the second conductive path 22 includes a second flexible conductor 46 that is conductive and electrically connected to an end portion of the second tubular conductor 41. The second flexible conductor 46 is more flexible than the second tubular conductor 41. Similarly to the first flexible conductor 36, in the present embodiment, the second flexible conductor 46 is a covered wire that has a core wire 37 formed by a conductor and an insulating covering 38 that covers the outer circumference of the core wire 37.

One end portion of the second flexible conductor 46 in the lengthwise direction is electrically connected to the second connection portion 44. At the one end portion of the second flexible conductor 46 that is connected to the second connection portion 44, the insulating covering 42 has been removed and the core wire 37 is exposed. Also, the one end portion of the second flexible conductor 46 at which the core wire 37 is exposed is arranged on the second connection surface 44a and electrically connected to the second connection portion 44 through welding such as ultrasonic welding.

The other end portion of the second flexible conductor 46 in the lengthwise direction is electrically connected to a connection terminal (not shown) provided at the connector 47. Note that the connector 47 is electrically connected to the electrical device 15.

The second conductive path 22 includes a covering member 48 that covers a portion at which the second tubular conductor 41 and the second flexible conductor 46 are connected to each other. The covering member 48 is similar to the covering member 40 provided on the first conductive path 21, and is a heat shrinkable tube in the present embodiment. The covering member 48 covers a portion of the other end portion of the second tubular conductor 41 that is exposed from the insulating covering 42 and a portion of the one end portion of the second flexible conductor 46 at which the core wire 37 is exposed.

Configuration of Exterior Members 23

As shown in FIG. 3, the exterior members 23 include a first exterior member 51 (first exterior cover) that covers the first conductive path 21, and a second exterior member 52 (second exterior cover) that is provided separately from the first exterior member 51 and covers the second conductive path 22. Note that, in the present embodiment, the first exterior member 51 and the second exterior member 52 substantially have the same configuration. Accordingly, in FIGS. 3, 5, and 6, due to the reference numeral of the second exterior member 52, which corresponds to the first exterior member 51, being indicated in parentheses, the second exterior member 52 that covers the second conductive path 22 will not be shown separately.

The first exterior member 51 and the second exterior member 52 are corrugated tubes that are more flexible than the first tubular conductor 31 and the second tubular conductor 41. Also, both the first exterior member 51 and the second exterior member 52 of the present embodiment are formed in a cylindrical shape having a circular cross section. The inner diameter of the first exterior member 51 is larger than the outer diameter of the first tubular conductor 31. Further, in the present embodiment, the inner diameter of the first exterior member 51 is larger than the outer diameter of the insulating covering 32 that covers the outer circumferential surface of the first tubular conductor 31. For this reason, there is a gap between the outer circumferential surface of the insulating covering 32 and the inner circumferential surface of the first exterior member 51. In other words, there is a gap that allows relative movement of the first exterior member 51 and the first tubular conductor 31 in the direction orthogonal to the axial direction of the first exterior member 51, between the outer circumferential surface of the first tubular conductor 31 and the inner circumferential surface of the first exterior member 51. Similarly, the inner diameter of the second exterior member 52 is greater than the outer diameter of the second tubular conductor 41. Further, in the present embodiment, the inner diameter of the second exterior member 52 is larger than the outer diameter of the insulating covering 42 that covers the outer circumferential surface of the second tubular conductor 41. For this reason, there is a gap between the outer circumferential surface of the insulating covering 42 and the inner circumferential surface of the second exterior member 52. In other words, there is a gap that allows relative movement of the second exterior member 52 and the second tubular conductor 41 in a direction orthogonal to the axial direction of the second exterior member 52, between the outer circumferential surface of the second tubular conductor 41 and the inner circumferential surface of the second exterior member 52.

As shown in FIGS. 5 and 6, the first exterior member 51 covers a portion of the first conductive path 21 between the first connection portion 33 and the connector 39 by housing the portion inside thereof.

As shown in FIG. 5, at one end portion of the first conductive path 21 on the first connection portion 33 side, one end portion of the insulating covering 32 on the first connection portion 33 side is exposed from the one end portion of the first exterior member 51 in the lengthwise direction. Accordingly, the first connection portion 33 and the connection terminal 35 are exposed from the one end portion of the exterior members 23 in the lengthwise direction. Also, at one end portion of the first exterior member 51 in the lengthwise direction, which is the end portion on the first connection portion 33 side, a waterblocking member 53 for suppressing ingress of liquid such as water into the first exterior member 51 through the one end portion of the first exterior member 51 is attached. In the present embodiment, the waterblocking member 53 is a vinyl tape. The waterblocking member 53, which is a vinyl tape, is wound around a portion spanning from the one end portion of the first exterior member 51 to the insulating covering 32 exposed from the one end portion. The waterblocking member 53 is in liquid tight contact with the outer circumferential surface of the first exterior member 51 and the outer circumferential surface of the insulating covering 32.

As shown in FIG. 6, at the other end portion of the first conductive path 21 on the first connection portion 34 side, the first exterior member 51 covers a portion extending to the connector 47 from a portion at which the first connection portion 34 and the first flexible conductor 36 are electrically connected. Accordingly, a portion of the first flexible conductor 36 where the insulating covering 38 has not been removed and the connector 47 are exposed from the other end portion of the first exterior member 51 in the lengthwise direction. In this manner, the first tubular conductor 31 and the first flexible conductor 36 are collectively covered with the first exterior member 51. In other words, in the first tubular conductor 31 and the first flexible conductor 36, the portions of the first tubular conductor 31 and the first flexible conductor 36 that are each to be covered with an exterior member are collectively covered with the one first exterior member 51.

At the other end portion of the first exterior member 51 in the lengthwise direction, which is the end portion on the first connection portion 34 side, a waterblocking member 54 for suppressing ingress of liquid such as water into the first exterior member 51 through the other end portion of the first exterior member 51 is attached. In the present embodiment, the waterblocking member 54 is a vinyl tape that is similar to the waterblocking member 53. The waterblocking member 54, which is a vinyl tape, is wound around a portion spanning from the other end portion of the first exterior member 51 to the insulating covering 38 of the first flexible conductor 36 exposed from the other end portion. The waterblocking member 54 is in liquid tight contact with the outer circumferential surface of the first exterior member 51 and the outer circumferential surface of the insulating covering 38.

Note that the second exterior member 52 covers a similar portion of the second conductive path 22. Further, a waterblocking member 55 that is similar to the waterblocking member 53 is attached to one end portion of the second exterior member 52 in the lengthwise direction. Further, a waterblocking member 56 that is similar to the waterblocking member 54 is attached to the other end portion of the second exterior member 52 in the lengthwise direction.

Fixing Mode of Wire Harness 20 to Vehicle 10

As shown in FIGS. 1 and 2, the wire harness 20 is provided with fixing members 57 for holding the first exterior member 51 and the second exterior member 52. The number of the fixing members 57 may be any number in accordance with the routing mode of the wire harness 20 in the vehicle 10. In the present embodiment, the wire harness 20 is provided with the two fixing members 57, for example. The two fixing members 57 hold the first exterior member 51 and the second exterior member 52 at two locations spaced apart from each other in the lengthwise direction of the wire harness 20. By these fixing members 57 being fixed to the vehicle 10, the first conductive path 21 and the second conductive path 22 are fixed to the vehicle 10. Note that in the present embodiment, the second conductive path 22 is routed in the vehicle 10 so as to extend in parallel with the first conductive path 21. The fixing members 57 hold the first exterior member 51 and the second exterior member 52 so as to maintain the distance between the first conductive path 21 and the second conductive path 22.

The operations of the present embodiment will now be described.

As shown in FIG. 4, the thickness T11 of the first tubular conductor 31 is different from the thickness T21 of the second tubular conductor 41. For this reason, even in the case where the outer diameter D11 of the first tubular conductor 31 is equal to the outer diameter D21 of the second tubular conductor 41, the transverse sectional area of the first tubular conductor 31 can be made different from the transverse sectional area of the second tubular conductor 41. Accordingly, the outer diameter D11 of the first tubular conductor 31 can be made equal to the outer diameter D21 of the second tubular conductor 41, while ensuring a transverse sectional area of the first tubular conductor 31 corresponding to the current value of the current that flows through the first tubular conductor 31 and ensuring a transverse sectional area of the second tubular conductor 41 corresponding to the current value of the current that flows through the second tubular conductor 41. As a result, the same mold of the pipe bender can be used to bend the first tubular conductor 31 and the second tubular conductor 41 without switching the mold between when bending the first tubular conductor 31 and when bending the second tubular conductor 41.

The effect of the present embodiment will now be described.

(1) The wire harness 20 is provided with the first conductive path 21, the second conductive path 22 that is different from the first conductive path 21, and the exterior members 23 that respectively cover the first conductive path 21 and the second conductive path 22. The first conductive path 21 includes the conductive first tubular conductor 31 having a tubular shape. The second conductive path 22 includes the conductive second tubular conductor 41 having a tubular shape. The thickness T11 of the first tubular conductor 31 is different from the thickness T21 of the second tubular conductor 41.

With this configuration, the outer diameter D11 of the first tubular conductor 31 and the outer diameter D21 of the second tubular conductor 41 can be set to the same length, while ensuring respective transverse sectional areas of the first tubular conductor 31 and the second tubular conductor 41 corresponding to the current values of the currents flowing therethrough. By doing so, the first tubular conductor 31 and the second tubular conductor 41 can be bent without switching molds of the pipe bender. As a result, the manufacturability of the wire harness 20 can be improved.

Also, for example, it is conceivable to configure the tubular conductor that is provided on the remaining conductive path to havfe an outer diameter and thickness that is the same as the outer diameter and thickness of the tubular conductor provided on the conductive path through which the current having the largest current value flows. By doing so, the tubular conductor provided on the remaining conductive path will have an excessive transverse sectional area and outer diameter. As a result, the wire harness will increase in size. In view of this, in the present embodiment, the thickness T11 of the first tubular conductor 31 and the thickness T21 of the second tubular conductor 41 are made different. In this manner, the respective transverse sectional areas of the first tubular conductor 31 and the second tubular conductor 41 are set to sizes corresponding to the current values of the currents that flow through the first tubular conductor 31 and the second tubular conductor 41. As a result, setting of the outer diameter D11 of the first tubular conductor 31 and the outer diameter D21 of the second tubular conductor 41 to excessive values is suppressed. Accordingly, an increase in size of the wire harness 20 can be suppressed.

Also, the first conductive path 21 and the second conductive path 22 can be protected from flying objects such as flying stones or waterdrops by the exterior members 23. Accordingly, the durability of the wire harness 20 can be improved.

(2) The first conductive path 21 further includes the first flexible conductor that is conductive and electrically connected to the end portion of the first tubular conductor 31. The second conductive path 22 further includes the conductive second flexible conductor that is electrically connected to the end portion of the second tubular conductor. The first flexible conductor 36 is more flexible than the first tubular conductor 31. The second flexible conductor 46 is more flexible than the second tubular conductor 41.

With this configuration, when the vehicle 10 vibrates, positional displacement between the parts connected to the two sides of the first flexible conductor 36 caused by the vibration can be absorbed by the first flexible conductor 36. In the present embodiment, the positional displacement between the first tubular conductor 31 and the connector 39 caused by the vibration of the vehicle 10 can be absorbed by the first flexible conductor 36. Accordingly, application of a load to the first connection portion 34 or to the connection terminal provided on the connector 39 can be suppressed.

Similarly, when the vehicle 10 vibrates, the positional displacement between the parts connected to the two sides of the second flexible conductor 46 caused by the vibration can be absorbed by the second flexible conductor 46. In the present embodiment, the positional displacement between the second tubular conductor 41 and the connector 47 caused by the vibration of the vehicle 10 can be absorbed by the second flexible conductor 46. Accordingly, application of a load to the second connection portion 44 and the connection terminal provided on the connector 47 can be suppressed.

(3) The first tubular conductor 31 and the first flexible conductor 36 are collectively covered with the first exterior member 51. The second tubular conductor 41 and the second flexible conductor 46 are collectively covered with the second exterior member 52.

With this configuration, the same exterior member can be used for covering the first tubular conductor 31 and the first flexible conductor 36. In other words, the one first exterior member 51 covers the first tubular conductor 31 and the first flexible conductor 36. Accordingly, the number of parts can be reduced compared to the case in which an exterior member for covering the first tubular conductor 31 and an exterior member for covering the first flexible conductor 36 are separately provided. Also, since the joint between the portion that covers the first tubular conductor 31 and the portion that covers the first flexible conductor 36 can be eliminated from the exterior member 23, ingress of liquid such as water into the exterior member 23, that is, the first exterior member 51, can be suppressed. As a result, adhesion of liquid to the portion where the first tubular conductor 31 and the first flexible conductor 36 are electrically connected can be suppressed. Further, a waterblocking member such as a grommet does not need to be arranged at the joint. Accordingly, an increase in the number of parts can be suppressed.

Similarly, the same exterior member can be used for covering the second tubular conductor 41 and the second flexible conductor 46. In other words, the one second exterior member 52 covers the second tubular conductor 41 and the second flexible conductor 46. For this reason, the number of parts can be reduced compared to the case in which an exterior member for covering the second tubular conductor 41 and an exterior member for covering the second flexible conductor 46 are separately provided. Also, since a joint between the portion that covers the second tubular conductor 41 and the portion that covers the second flexible conductor 46 can be eliminated from the exterior member 23, ingress of liquid such as water into the exterior member 23, that is, the second exterior member 52, can be suppressed. As a result, adhesion of liquid to the portion at which the second tubular conductor 41 and the second flexible conductor 46 are electrically connected can be suppressed. Further, a waterblocking member such as a grommet does not need to be arranged at the joint. Accordingly, an increase in the number of parts can be suppressed.

(4) The first exterior member 51 is a corrugated tube that is more flexible than the first tubular conductor 31. The second exterior member 52 is a corrugated tube that is more flexible than the second tubular conductor 41. Between the outer circumferential surface of the first tubular conductor 31 and the inner circumferential surface of the first exterior member 51, which is a corrugated tube, there is a gap that allows relative movement of the first exterior member 51 and the first tubular conductor 31 in the direction orthogonal to the axial direction of the first exterior member 51. Between the outer circumferential surface of the second tubular conductor 41 and the inner circumferential surface of the second exterior member 52, which is a corrugated tube, there is a gap that allows relative movement of the second exterior member 52 and the second tubular conductor 41 in the direction orthogonal to the axial direction of the second exterior member 52. The wire harness 20 is provided with the fixing members 57 that hold the first exterior member 51 and the second exterior member 52 and are fixed to the vehicle 10.

With this configuration, the shape of the first tubular conductor 31 is maintained, and thus the first tubular conductor 31 is unlikely to deform or move when attaching the wire harness 20 to the vehicle 10. However, within the range of the gap between the outer circumferential surface of the first tubular conductor 31 and the inner circumferential surface of the exterior member 51, which is a corrugated tube, the first tubular conductor 31 can move in the direction orthogonal to the axial direction of the first exterior member 51 relative to the first exterior member 51. Due to the first exterior member 51 being fixed to the vehicle 10 through the fixing member 57, the first tubular conductor 31 is fixed to the vehicle 10. For this reason, due to deformation of the first exterior member 51 formed by a corrugated tube that is more flexible than the first tubular conductor 31, the dimensional tolerance between the vehicle 10 and the first tubular conductor 31 can be absorbed without moving the first tubular conductor 31 relative to the vehicle 10.

Similarly, the shape of the second tubular conductor 41 is maintained, and thus the second tubular conductor 41 is unlikely to deform or move when attaching the wire harness 20 to the vehicle 10. However, within the range of the gap between the outer circumferential surface of the second tubular conductor 41 and the inner circumferential surface of the second exterior member 52, which is a corrugated tube, the second tubular conductor 41 can move in the direction orthogonal to the axial direction of the second exterior member 52 relative to the second exterior member 52. Due to the second exterior member 52 being fixed to the vehicle 10 through the fixing member 57, the second tubular conductor 41 is fixed to the vehicle 10. For this reason, due to deformation of the second exterior member 52 formed by a corrugated tube that is more flexible than the second tubular conductor 41, the dimensional tolerance between the vehicle 10 and the second tubular conductor 41 can be absorbed without moving the second tubular conductor 41 relative to the vehicle 10.

Further, the dimensional tolerance between the vehicle 10 and the first tubular conductor 31 and the dimensional tolerance between the vehicle 10 and the second tubular conductor 41 need not be absorbed on the fixing members 57 side. Accordingly, fixing members having a complex structure need not be used in order to absorb the tolerance, and thus complication of the structure of the wire harness 20 and an increase in the manufacturing cost of the wire harness 20 can be suppressed.

Further, since the first exterior member 51 is a corrugated tube that is more flexible than the first tubular conductor 31, even if the first exterior member 51 covers the first tubular conductor 36, the first exterior member 51 can easily follow the deformation of the first flexible conductor 36. Accordingly, when connecting the connector 39 that is electrically connected to the other end portion of the first flexible conductor 36 to the electrical device 13, deformation of the first flexible conductor 36 tends not to be inhibited by the first exterior member 51, and thus the first flexible conductor 36 can be easily deformed according to the routing path. Similarly, since the second exterior member 52 is a corrugated tube that is more flexible than the second tubular conductor 41, even if the second exterior member 52 covers the second tubular conductor 46, the second exterior member 52 can easily follow the deformation of the second flexible conductor 46. Accordingly, when connecting the connector 47 that is electrically connected to the other end portion of the second flexible conductor 46 to the electrical device 15, deformation of the first flexible conductor 36 tends not to be inhibited by the second exterior member 52, and thus the second flexible conductor 46 can be easily deformed in accordance with the routing path.

Further, at the tubular portion of the first tubular conductor 31 between the first connection portion 33 and the first connection portion 34, the shape of the first tubular conductor 31 is maintained. For this reason, the first conductive path 21 can be inhibited from hanging down. Similarly, at the tubular portion of the second tubular conductor 41 between the second connection portion 43 and the second connection portion 44, the shape of the second tubular conductor 41 is maintained. For this reason, the second conductive path 22 can be inhibited from hanging down. Accordingly, the number of fixing members 57 for fixing the wire harness 20 to the vehicle 10 can be reduced. As a result of this, the number of parts of the wire harness 20 can be reduced. Further, since the number of fixing members 57 is small, the wire harness 20 can be easily fixed to the vehicle 10.

Accordingly, the connection workability of the wire harness 20 can be improved, and the assembly performance of the wire harness 20 to the vehicle 10 can be improved.

(5) The exterior member 23 includes the first exterior member 51 that covers the first conductive path 21, and the second exterior member 52 that is provided separately from the first exterior member 51 and covers the second conductive path 22.

With this configuration, the wire harness 20 can be made more compact compared to the case in which one exterior member collectively covers the first conductive path 21 and the second conductive path 22. For example, in the case where the first conductive path 21 and the second conductive path 22 are covered with one cylindrical corrugated tube, the outer diameter of the corrugated tube becomes larger in order to arrange both the first conductive path 21 and the second conductive path 22 thereinside. Accordingly, the wire harness is made larger. Compared to this, as in the present embodiment, due to the first conductive path 21 and the second conductive path 22 being individually covered with the first exterior member 51 and the second exterior member 52, the length of the wire harness 20 in the direction orthogonal to the lengthwise direction of the wire harness 20 can be made smaller.

In the present embodiment, the wire harness 20 is mostly routed under the floor of the vehicle 10. For this reason, in order to ensure the minimum ground clearance of the vehicle body, it is preferable to suppress the length of the wire harness 20 in the direction orthogonal to the lengthwise direction of the wire harness 20. Accordingly, in the wire harness 20 of the present embodiment, the minimum ground clearance can be readily ensured compared to a wire harness having a configuration in which the first conductive path 21 and the second conductive path 22 are covered with one cylindrical corrugated tube.

Also, in the case where the first conductive path 21 and the second conductive path 22 are covered with one cylindrical corrugated tube, it is conceivable that the minimum ground clearance of the vehicle body is ensured by using a flat corrugated tube having a racetrack-shaped cross section. However, since the degree of freedom of such a flat corrugated tube in a bending direction is smaller than that of a cylindrical corrugated tube, the degree of freedom of the routing path is decreased. In view of this, since the first exterior member 51 and the second exterior member 52 of the present embodiment are cylindrical corrugated tubes, with the wire harness 20 of the present embodiment, the degree of freedom of the routing path can be improved while ensuring the minimum ground clearance of the vehicle body.

The present embodiment can be modified and implemented as follows. The present embodiment and the following modified examples can be implemented in combination with each other as long as there is no technical discrepancy.

In the above embodiment, the first connection portion 33 is electrically connected to the electrical device 12 via the connection terminal 35 that is electrically connected to the first connection portion 33. However, the first connection portion 33 may also be electrically connected directly to a connection member such as a terminal included in the electrical device 12.

Figure 7:
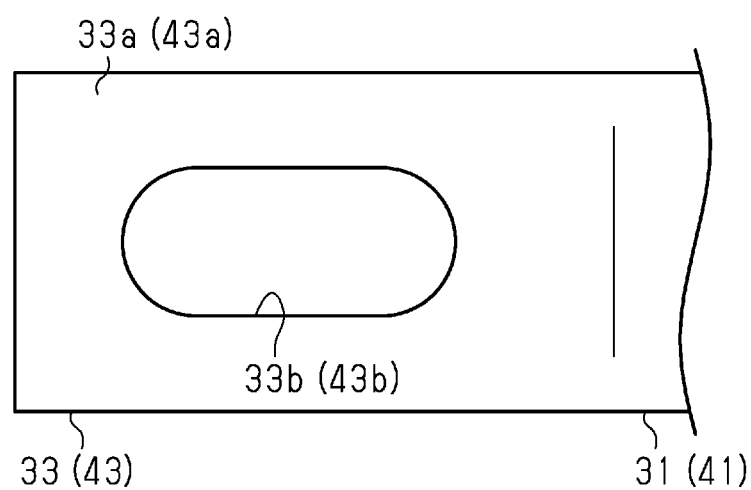
FIG. 7 is a plan view showing an end portion of a tubular conductor according to a variation.

For example, in the example shown in FIG. 7, the first connection portion 33 includes a first connection hole 33*b* that passes through the first connection portion 33 in the direction orthogonal to the first connection surface 33*a*. In this example, the first connection hole 33*b* passes through the first connection portion 33 in the direction orthogonal to the first connection surface 33*a*. The first connection hole 33*b* may have any shape. For example, the shape of the first connection hole 33*b* as seen in the passing-through direction may also be a circular shape, a polygonal shape, or the like. In this example, the first connection hole 33*b* is an oblong hole elongated in the direction in which the first tubular conductor 31 extends. Note that, the second connection portion 43 may also include a second connection hole 43*b* that has the similar shape to the first connection hole 33*b* and passes through the second connection portion 43 in the direction orthogonal to the second connection surface 43*a*. In FIG. 7, in the second tubular conductor 41, the reference numerals of the second connection portion 43, which correspond to the first connection portion 33 of the first tubular conductor 31, and the second connection hole 43*b*, which corresponds to the first connection hole 33*b* of the first tubular conductor 31, are indicated in parentheses.

By doing so, the first connection portion 33 can be directly connected to the connection member included in the electrical device 12 mounted in the vehicle 10 using a bolt or the like. For this reason, a connection terminal connected to the connection member of the electrical device 12 need not be separately connected to the end portion of the first tubular conductor 31. Accordingly, the number of parts constituting the first conductive path can be reduced. Further, the step of connecting the connection terminal to the end portion of the first tubular conductor 31 need not be performed, and thus the manufacturability of the wire harness 20 can be further improved.

Similarly, by using a bolt or the like, the second connection portion 43 can be directly connected to a connection member such as a terminal included in the electrical device 14 mounted in the vehicle 10. For this reason, the connection terminal connected to the connection member of the electrical device 14 need not be separately connected to the end portion of the second tubular conductor 41. Accordingly, the number of parts constituting the second conductive path 22 can be reduced. Further, the step of connecting the connection terminal to the end portion of second tubular conductor 41 need not be performed, and thus the manufacturability of the wire harness 20 can be further improved.

Further, the first connection hole 33*b* is an oblong hole elongated in the direction in which the first tubular conductor 31 extends, and thus the dimensional tolerance between the connection member of the electrical device 12 and the first conductive path 21 in the direction in which the first tubular conductor 31 extends can be absorbed through the first connection hole 33*b*. As a result, positioning of the first connection portion 33 and the connection member of the electrical device 12 becomes easier, and thus the connection workability of the first conductive path 21 and the electrical device 12 can be improved. Similarly, the second connection hole 43*b* is an oblong hole elongated in the direction in which the second tubular conductor 41 extends, and thus the dimensional tolerance between the connection member of the electrical device 14 and the second conductive path 22 in the direction in which the second tubular conductor 41 extends can be absorbed through the second connection hole 43*b*. As a result, positioning of the second connection portion 43 and the connection member of the electrical device 14 becomes easier, and thus the connection workability of the second conductive path 22 and the electrical device 14 can be improved.

In the above embodiment, the first conductive path 21 and the second conductive path 22 are separately covered with the first exterior member 51 and the second exterior member 52. However, the exterior member 23 may also collectively cover the first conductive path 21 and the second conductive path 22. For example, the exterior member 23 may also be formed by one corrugated tube. The first conductive path 21 and the second conductive path 22 may also be arranged inside this corrugated tube.

By doing so, the number of parts can be reduced compared to the case in which the exterior member that covers the first conductive path 21 and the exterior member that covers the second conductive path 22 are separately provided. Further, since the first conductive path 21 and the second conductive path 22 are housed in the one exterior member 23, handling of the wire harness 20 become easier. Accordingly, the wire harness 20 can be easily fixed to the vehicle 10.

In the above embodiment, both the first exterior member 51 and the second exterior member 52 are a cylindrical corrugated tube. However, the shape of the corrugated tube used for the exterior member 23 is not limited to a cylindrical shape. For example, a tubular corrugated tube having an oval or racetrack-shaped cross section may also be used for the exterior member 23. Further, the exterior member 23 is not limited to a corrugated tube, and need only be able to cover the first conductive path 21 and the second conductive path 22. For example, at least one of the first exterior member 51 and the second exterior member 52 may also be a twisted tube.

In the above embodiment, the wire harness 20 includes the fixing members 57. However, the wire harness 20 need not necessarily include the fixing members 57.

In the above embodiment, the first tubular conductor 31 and the first flexible conductor 36 are collectively covered with the first exterior member 51. Also, the second tubular conductor 41 and the second flexible conductor 46 are collectively covered with the second exterior member 52. However, the first tubular conductor 31 and the first flexible conductor 36 may also be respectively covered with different exterior members. Similarly, the second tubular conductor 41 and the second flexible conductor 46 may also be respectively covered with different exterior members.

Instead of the heat shrinkable tube, an insulating vinyl tape may also be used as the covering members 40 and 48. Also, the covering member 40 may also be formed by an insulating resin that is applied to the portion at which the first tubular conductor 31 and the first flexible conductor 36 are electrically connected. This also applies to the covering member 48. Also, the first conductive path 21 need not necessarily include the covering member 40. The second conductive path 22 need not necessarily include the covering member 48.

In the above embodiment, both the first flexible conductor 36 and the second flexible conductor 46 are covered wires each including the core wire 37 formed by a conductor and the insulating covering 38 covering the outer circumference of the core wire 37. However, the first flexible conductor 36 is not limited to a covered wire, and need only be a member that is conductive and more flexible than the first tubular conductor 31. Similarly, the second flexible conductor 46 is not limited to a covered wire, and need only be a member that is conductive and more flexible than the second tubular conductor 41.

For example, as the first flexible conductor 36, a braided wire formed by conductive strands braided into a tubular shape may be used. In this case, the other end portion of the first tubular conductor 31 may also be a first connection portion 34 that is similar to the above embodiment, and may also remain a cylindrical shape without being flattened. When the first flexible conductor 36 formed by braided wires is connected to the first connection portion 34, the first flexible conductor 36 can be connected through welding such as ultrasonic welding. Also, when the other end portion of the first tubular conductor 31 has a cylindrical shape, the other end portion of the first tubular conductor 31 is inserted into the first flexible conductor 36 formed by the braided wires. Thereafter, the first flexible conductor 36 is electrically connected to the outer circumferential surface of the other end portion of the first tubular conductor 31. For example, a fixing ring is attached to the other end portion of the first tubular conductor 31 from the outer circumference side of the first tubular conductor 36 and the first flexible conductor 36 is crimped. And thus, the first tubular conductor 31 and the first flexible conductor 36 can be electrically connected. At this time, if an annular groove is formed by swaging the other end portion of the first tubular conductor 31, a fixing ring can be attached to the groove. Accordingly, positioning of the fixing ring relative to the first tubular conductor 31 can be easily performed. Note that the similar modification can be made to the second tubular conductor 41 and the second flexible conductor 46.

In the above embodiment, the other end portion of the first flexible conductor 36 is connected to the connector 39. However, a connection terminal such as a round terminal may also be electrically connected to the other end portion of the first flexible conductor 36. In this case, the first tubular conductor 31 is electrically connected to the electrical device 13 via the first flexible conductor 36 and the connection terminal by the connection terminal being electrically connected to the connection terminal included in the electrical device 13. Similarly, a connection terminal such as a round terminal may also be electrically connected to the other end portion of the second flexible conductor 46 instead of the connector 47.

In the above embodiment, out of the two end portions of the first tubular conductor 31 in the extension direction thereof, the first flexible conductor 36 is connected to only the other end portion. However, the first flexible conductor 36 may also be electrically connected to the one end portion of the first tubular conductor 31. In this case, the other end portion of the first tubular conductor 31 may be connected to a first flexible conductor 36 that is different from the first flexible conductor 36 connected to the one end portion of the first tubular conductor 31, or may be electrically connected to the connection terminal 35. Also, in this case, the other end portion of the first tubular conductor 31 may also be electrically connected directly to a connection member such as a terminal included in the electrical device 13.

Similarly, in the above embodiment, out of the two end portions of the second tubular conductor 41 in the extension direction thereof, the second flexible conductor 46 is connected to only the other end portion. However, the second flexible conductor 46 may also be electrically connected to the one end portion of the second tubular conductor 41. In this case, the other end portion of the second flexible conductor 46 may be connected to a second flexible conductor 46 that is different from the second flexible conductor 46 connected to the one end portion of the second tubular conductor 41, or may be connected to the connection terminal 35. Also, in this case, the other end portion of the second tubular conductor 41 may also be electrically connected directly to a connection member such as a terminal included in the electrical device 15.

The first conductive path 21 need not necessarily include the first flexible conductor 36. In this case, the connection terminal 35 may also be connected to the two end portions of the first tubular conductor 31 in the direction in the extension direction thereof. In this case, the two end portions of the first tubular conductor 31 may also be electrically connected directly to connection members such as terminals included in the electrical devices 12 and 13. Also, the connection terminal 35 may also be electrically connected to one of the two end portions of the first tubular conductor 31 in the extension direction thereof, and the other end portion may also be electrically connected directly to a connection terminal such as a terminal included in the electrical device.

Similarly, the second conductive path 22 need not necessarily include the second flexible conductor 46. In this case, the connection terminal 45 may also be connected to the two end portions of the second tubular conductor 41 in the extension direction thereof. In this case, the two end portions of the second tubular conductor 41 may also be electrically connected directly to a connection member such as terminals included in the electrical devices 14 and 15. Also, the connection terminal 45 may also be electrically connected to one of the two end portions of the second tubular conductor 41 in the extension direction thereof, and the other end portion may also be electrically connected directly to the connection terminal such as a terminal included in the electrical device.

In the above embodiment, round terminals are used as the connection terminals 35 and 45. However, the connection terminals 35 and 45 are not limited to being round terminals, and may also be crimping terminals such as Y-terminals. Also, the connection terminals 35 and 45 are not limited to being crimping terminals, and may also be terminals having any shape such as bus bars.

In the above embodiment, all of the waterblocking members 53 to 56 are formed by a vinyl tape. However, the waterblocking members 53 and 54 need only be able to suppress ingress of liquid into the first exterior member 51 through the two end portions of the first exterior member 51. Similarly, the waterblocking members 55 and 56 need only be able to suppress ingress of liquid into the second exterior member 52 through the two end portions of the second exterior member 52. For example, the waterblocking member 54 may also be a grommet that covers the outer circumference of the first flexible conductor 36 exposed from the other end portion of the first exterior member 51 on the first connection portion 34 side, and is in liquid tight contact with the outer circumferential surface or the inner circumferential surface of the other end portion of the first exterior member 51 or the outer circumferential surface of the connector 39. Also, the waterblocking member 56 may also be a grommet that is similar to the above. Also, for example, the waterblocking member 53 may also be a grommet that is in liquid tight contact with the outer circumferential surface of the insulating covering 32 exposed from one end portion of the first exterior member 51 on the first connection portion 33 side, and the outer circumferential surface or the inner circumferential surface of the one end portion of the first exterior member 51. Also, the waterblocking member 55 may also be a grommet that is similar to the above. Note that the wire harness 20 need not necessarily include the waterblocking members 53 to 56.

The insulating covering 32 is not limited to a tubular covering that is externally fitted to the first tubular conductor 31. For example, the insulating covering 32 may also be an insulating material applied or painted on the outer circumferential surface of the first tubular conductor 31. In this case, the first tubular conductor 31 may also be bent before the insulating covering 32 is provided, or bent after the insulating covering 32 is provided. The same variation can be applied to the insulating covering 42 that covers the outer circumferential surface of the second tubular conductor 41.

In the above embodiment, both the first tubular conductor 31 and the second tubular conductor 41 have a cylindrical shape having an annular cross section. However, the first tubular conductor 31 and the second tubular conductor 41 need not necessarily be formed in a cylindrical shape and need only be shaped in a tubular shape that can maintain its shape. For example, the first tubular conductor 31 and the second tubular conductor 41 may also have a flat tubular shape having an oval or racetrack shape in cross section.

In the above embodiment, the second conductive path 22 is routed in the vehicle 10 so as to extend parallel with the first conductive path 21. However, the second conductive path 22 need not necessarily be routed so as to extend parallel with the first conductive path 21. Also, the length of the first conductive path 21, the length of the first tubular conductor 31, the number of bent portions in the first tubular conductor 31 formed using the pipe bender, the length of the second conductive path 22, the length of the second tubular conductor 41, and the number of bent portions in the second tubular conductor 41 formed using the pipe bender may be changed as appropriate.

In the above embodiment, the wire harness 20 includes the two conductive paths, the first conductive path 21 and the second conductive path 22. However, the number of conductive paths included in the wire harness 20 is not limited to this. For example, the wire harness 20 may have three or more conductive paths. In one example, the wire harness may further include a third conductive path that is different from the first conductive path 21 and the second conductive path 22. In this case, the third conductive path includes a conductive third tubular conductor that is tubular in shape. Then, in the wire harness, the larger the current value of the current flowing through the conductive path on which the tubular conductor is provided, the thicker the tubular conductor is. The outer diameters of the tubular conductors are equally formed. The third conductive path electrically connects the electrical devices 11 mounted in the vehicle 10.

The present disclosure encompasses the following aspects. Reference numerals are given to some constituent elements of the exemplary embodiment in order to facilitate understanding, and are not intended to be limitation. A portion of the features described in the following aspects may be omitted, and some of the features described in the aspects may be selected or extracted to be combined.

[1] A wire harness including a conductive path, a corrugated tube for covering the conductive path, and a fixing member that holds the corrugated tube and is to be fixed to a vehicle, wherein the conductive path includes a conductive tubular conductor that is tubular in shape, the corrugated tube is more flexible than the tubular conductor, and there is a gap that allows relative movement of the corrugated tube and the tubular conductor in a direction orthogonal to an axial direction of the corrugated tube, between the outer circumferential surface of the tubular conductor and the inner circumferential surface of the corrugated tube.

With this configuration, the shape of the first tubular conductor is maintained, and thus the tubular conductor is unlikely to deform or move when attaching the wire harness to the vehicle. However, in this wire harness, the tubular conductor can move in the direction orthogonal to the axial direction of the corrugated tube relative to the corrugated tube within the range of the gap between the outer circumferential surface of the tubular conductor and the inner circumferential surface of the corrugated tube. By the corrugated tube being fixed to the vehicle through the fixing member, the tubular conductor is fixed to the vehicle. For this reason, due to deformation of the corrugated tube, which is more flexible than the tubular conductor, the dimensional tolerance between the vehicle and the tubular conductor can be absorbed without moving the tubular conductor relative to the vehicle.

[2] A wire harness (20) according to one or a plurality of aspects of the present disclosure may include:
   a first conductive path (21);
   a second conductive path (22) provided side by side with the first conductive path (21); and
   one or a plurality of exterior members (23; 51, 52) that loosely cover the first conductive path (21) and the second conductive path (22),
   wherein the first conductive path (21) may include a first radially inward facing surface forming a first internal space (D12), a first radially outward facing surface that faces an opposite side to the first radially inward facing surface, and a first tubular conductor (31) that has one or more bent portions,
   the second conductive path (22) may include a second radially inward facing surface forming a second internal space (D22), a second radially outward facing surface that faces an opposite side to the second radially inward facing surface, and a second tubular conductor (41) that has one or more bent portions,
   the first tubular conductor (31) may have a first conductor cross sectional area defined by the first radially inward facing surface and the first radially outward facing surface,
   the second tubular conductor (41) may have a second conductor cross sectional area defined by the second radially inward facing surface and the second radially outward facing surface,
   the first conductor cross sectional area of the first tubular conductor (31) is adapted to a current flow of a first current having a first current value, the second conductor cross sectional area of the second tubular conductor (31) is adapted to a current flow of a second current having a second current value, and in a cross sectional view transversing the length the first tubular conductor (31) and the second tubular conductor (41), the shape and dimension of the first radially outward facing surface of the first tubular conductor (31) may match or substantially match the shape and dimension of the second radially outward facing surface of the second tubular conductor (41).

[3] In one or a plurality of aspects of the present disclosure, the second current value is larger than the first current value, the second conductor cross sectional area is larger than the first conductor cross sectional area, and in a cross sectional view transversing the length of the first tubular conductor (31) and the second tubular conductor (41), the first radially outward facing surface of the first tubular conductor (31) and the second radially outward facing surface of the second tubular conductor (41) may have the same outline shape as each other and the same outline dimensions as each other.

[4] In one or a plurality of aspects of the present disclosure, the second current value is larger than the first current value, and the second conductor cross sectional area is larger than the first conductor cross sectional area, and in a cross sectional view transversing the length of the first tubular conductor (31) and the second tubular conductor (41), the cross sectional area of the first internal space (D12) of the first tubular conductor (31) may be larger than the cross sectional area of the second internal space (D22) of the second tubular conductor (41).

[5] In one or a plurality of aspects of the present disclosure, the first tubular conductor (31) may have a first conductor thickness (T11) that may be the shortest distance between the first radially inward facing surface and the first radially outward facing surface, the second tubular conductor (41) may have a second conductor thickness (T21) that may be the shortest distance between the second radially inward facing surface and the second radially outward facing surface, the second current value may be larger than the first current value, and the second conductor thickness (T21) may be larger than the first conductor thickness (T11).

[6] In one or a plurality of aspects of the present disclosure, the first tubular conductor (31) and the second tubular conductor (41) may be made of the same conductive metal.

[7] In one or a plurality of aspects of the present disclosure, the first tubular conductor (31) and the second tubular conductor (41) may be made of the different conductive metals.

[8] In one or a plurality of aspects of the present disclosure, the one or the plurality of exterior members (23; 51, 52) may form a gap or a fluid path that allow a fluid that may be air to flow in the lengthwise direction of the exterior member, inward of the exterior member and outward of the first radially outward facing surface of the first tubular conductor (31) and the second radial outward surface of the second tubular conductor (41).

[9] In one or a plurality of aspects of the present disclosure, the wire harness (20) may be provided with a fixing member (57) that is in contact with an outer surface of the one or the plurality of exterior members (23; 51, 52) and fixedly hold the one or the plurality of exterior members (23; 51, 52).

The invention claimed is:

1. A wire harness comprising:
a first conductive path;
a second conductive path that is different from and is separately provided from the first conductive path; and
an exterior cover that covers the first conductive path and the second conductive path, wherein:
the first conductive path includes a conductive first tubular conductor that is tubular in shape and is covered by a first insulation cover,
the second conductive path includes a conductive second tubular conductor that is tubular in shape and is covered by a second insulation cover,
a thickness of the first tubular conductor is different from a thickness of the second tubular conductor,
an inner diameter of the exterior cover covering the first conductive path is larger than an outer diameter of the first insulation cover to create a first gap of space there-between,
an inner diameter of the exterior cover covering the second conductive path is larger than an outer diameter of the second insulation cover to create a second gap of space there-between,
the first conductive path further includes a conductive first flexible conductor electrically connected to an end of the first tubular conductor,
the second conductive path further includes a conductive second flexible conductor electrically connected to an end of the second tubular conductor,
the first flexible conductor is more flexible than the first tubular conductor, and
the second flexible conductor is more flexible than the second tubular conductor.

2. The wire harness according to claim 1, wherein:
the first tubular conductor and the first flexible conductor are collectively covered with the exterior cover, and
the second tubular conductor and the second flexible conductor are collectively covered with the exterior cover.

3. The wire harness according to claim 1, wherein:
the exterior cover is a corrugated tube that is more flexible than the first tubular conductor and the second tubular conductor,
the first gap allows relative movement of the corrugated tube and the first tubular conductor in a direction orthogonal to an axial direction of the corrugated tube, between an outer circumferential surface of the first tubular conductor and an inner circumferential surface of the corrugated tube,
the second gap allows relative movement of the corrugated tube and the second tubular conductor in a direction orthogonal to the axial direction of the corrugated tube, between an outer circumferential surface of the second tubular conductor and the inner circumferential surface of the corrugated tube, and
the wire harness further comprises a fixing member that holds the corrugated tube and is to be fixed to a vehicle.

4. The wire harness according to claim 1,
wherein the exterior cover includes a first exterior cover covering the first conductive path and a second exterior cover that is provided separately from the first exterior cover and covers the second conductive path.

5. The wire harness according to claim 1, wherein:
the first tubular conductor includes, at the end of the first tubular conductor, a first connection that includes a flat first connection surface, the second tubular conductor includes, at the end of the second tubular conductor, a second connection that includes a flat second connection surface, the first connection has a first connection hole that passes through the first connection in a direction intersecting the first connection surface, and the second connection has a second connection hole that passes through the second connection in a direction intersecting the second connection surface.

6. The wire harness according to claim 5, wherein:

the first connection hole is an oblong hole elongated in a direction in which the first tubular conductor extends, and the second connection hole is an oblong hole elongated in a direction in which the second tubular conductor extends.

7. The wire harness according to claim 1, wherein:

the first tubular conductor has a thickness corresponding to a current value of a current that flows through the first conductive path, the second tubular conductor has a thickness corresponding to a current value of a current that flows through the second conductive path, and the current value of the current that flows through the first conductive path is different from the current value of the current that flows through the second conductive path, and an outer diameter of the first tubular conductor is equal to an outer diameter of the second tubular conductor.

8. The wire harness according to claim 7, wherein the first tubular conductor and the second tubular conductor each have one or more bends.

9. The wire harness according to claim 1, wherein:

the exterior cover includes a first exterior cover covering the first conductive path and a second exterior cover covering the second conductive path, the first tubular conductor is adapted to a current flow of a first current having a first current value, the second tubular conductor is adapted to a current flow of a second current having a second current value, the first tubular conductor has a first thickness corresponding to the first current value, the second tubular conductor has a second thickness corresponding to the second current value, the first thickness of the first tubular conductor is different from the second thickness of the second tubular conductor, and an outer diameter of the first tubular conductor is equal to an outer diameter of the second tubular conductor, and an outer diameter of the first exterior cover is equal to an outer diameter of the second exterior cover.

10. The wire harness according to claim 1, wherein the first gap of space has an annular shape surrounding an entire outer circumferential surface of the first insulation cover, and the second gap of space has an annular shape surrounding an entire outer circumferential surface of the second insulation cover.

* * * * *